(12) United States Patent
Groel et al.

(10) Patent No.: US 6,405,461 B1
(45) Date of Patent: Jun. 18, 2002

(54) MEANS FOR STEAMING TEXTILES

(75) Inventors: Ken Groel, Whitehouse; Joseph Seickel, Bridgewater, both of NJ (US)

(73) Assignee: Seikel and Son, Inc, Newark, NJ (US)

( * ) Notice: Subject to any disclaimer, the term of this patent is extended or adjusted under 35 U.S.C. 154(b) by 0 days.

(21) Appl. No.: 09/949,328

(22) Filed: Sep. 10, 2001

(51) Int. Cl.$^7$ .............................................. D06F 73/00
(52) U.S. Cl. ...................................................... 38/1 A
(58) Field of Search ......................... 38/1 A, 7, 9, 144, 38/69; 223/70, 71, 72; 428/220, 904; 264/345; 29/91, 91.1

(56) References Cited

U.S. PATENT DOCUMENTS

| | | | |
|---|---|---|---|
| 2,829,450 A | * 4/1958 | Fronrath | ...................... 223/82 |
| 2,974,432 A | * 3/1961 | Warnock et al. | ......... 139/383 R |
| 4,923,555 A | * 5/1990 | Elliott et al. | ................... 100/74 |
| 5,532,050 A | * 7/1996 | Brooks | ......................... 156/296 |
| 5,970,637 A | * 10/1999 | Mohan et al. | ................. 223/70 |

* cited by examiner

Primary Examiner—Ismael Izaguirre
(74) Attorney, Agent, or Firm—Charles E. Temko

(57) ABSTRACT

A means and method for heat treating an upholstered workpiece such as a vehicle seat, including an enclosed cabinet mounting plural parallel-extending steam heated manifolds on either side of the workpiece as it passes between the manifolds. Unused steam is recirculated to a steam generator. By treating the entire surfaces of the workpiece, it is possible to eliminate the steaming of individually detected wrinkles, thereby saving both production time and associated manual labor. In an alternate method, the steam manifold is formed as an elongated loop and the workpiece is passed through an enclosed area formed by said loop as the upholstered part of the workpiece is unfolded upon a rigid frame.

9 Claims, 6 Drawing Sheets

MEANS FOR STEAMING TEXTILES

BACKGROUND OF THE INVENTION

This invention relates generally to the field of heat treatment of textile fabrics, and more particularly to an improved means and method for live steam heat treatment of upholstered seats for vehicles and similar articles as they pass along a production line conveyor.

In the manufacture of upholstered articles, typically seats for vehicles, the assembly of the workpiece has become highly automated, wherein mechanical means is provided to install padding and the outer upholstered shell of the seat. As the seats pass down a conveyor line, wrinkles in the fabric caused by the fact that the material forming the outer surface is not in planar condition is typically manually detected by individual workers a who employ a known type of electrically powered steam iron which directs steam directly to the wrinkled area, following which the workpiece continues to travel down the assembly line. Because the operation of the assembly line is a continuous operation, very often more than one worker is required for this step, and the effectiveness of this procedure depends, to some degree upon the visual observation of the worker. Thus, if conveyor time is to be maintained, considerable manual labor is necessary.

The manufacture of upholstered vehicle seats has become a highly developed art, in which the upholstered elements are fitted to the rigid frame as a mechanical operation at a station on a continuous assembly line. Since the fabrics are not initially in planar condition but rather, follow the contour of the seat, wrinkles will occur depending upon the resiliency of the particular fabrics being employed. In most cases, the material is laminated to include a textile lamina, It is known in the art to remove wrinkles in relatively specific areas by manually steaming them when they are visibly detected. This has been a time consuming process and does not lend itself to in-line operation.

SUMMARY OF THE INVENTION

Briefly stated, the invention contemplates the provision of an improved means and method for rapidly steaming assembled vehicle seats, using super heated steam at a production line station wherein the operation is confined within a partially enclosed cabinet to ensure minimum loss of heat, and subject the workpiece to uniform treatment without the necessity of detecting individual wrinkles. To this end, the means includes an electrically powered heater for supplying super heated steam. The steam is conducted through manifolding to an open-sided cabinet having a plurality of manifolds with evenly spaced nozzles positioned to traverse the width of the workpiece being treated. Means is provided for collecting unused steam and condensate, and return it to the steam heater for reheating and recirculation. Separate sensor means is provided for each manifold to operate individual solenoid valves regulating steam supply. At another production line station, the back element upholstery is installed from a progressive insideout condition and simultaneously steamed as it is seated using a loop-shaped steam manifold to remove wrinkles in a progressive manner. Since substantially the entire area of the seat is subjected to a steaming operation, it is not necessary to perform visual inspection for wrinkles, resulting in elimination of a substantial amount of manual labor. Means is also provided to sense the presence of the workpiece within the cabinet to control the supply of steam to the workpiece, and stop the supply of steam when no workpiece is present. Means is also provided to maintain the steam manifolds at a constant temperature, even when the steam nozzles are inoperative.

BRIEF DESCRIPTION OF THE DRAWINGS

In the drawings, to which reference will be made in the specification, similar reference characters have been employed to designate corresponding parts throughout the several views.

DETAILED DESCRIPTION OF THE DISCLOSED EMBODIMENT

Figure 1:
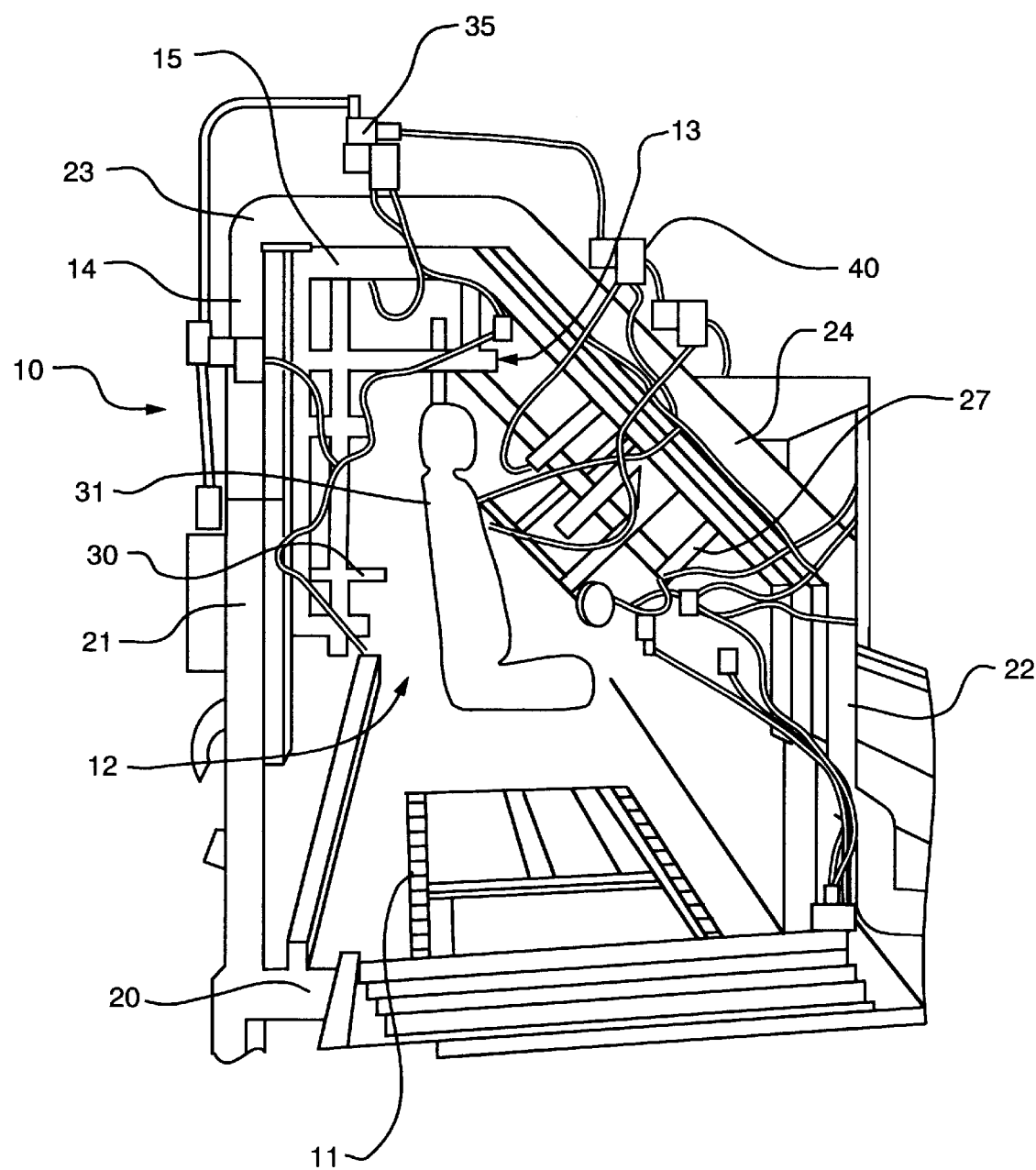
FIG. 1 is a perspective view of a first embodiment of the invention.
Figure 2:
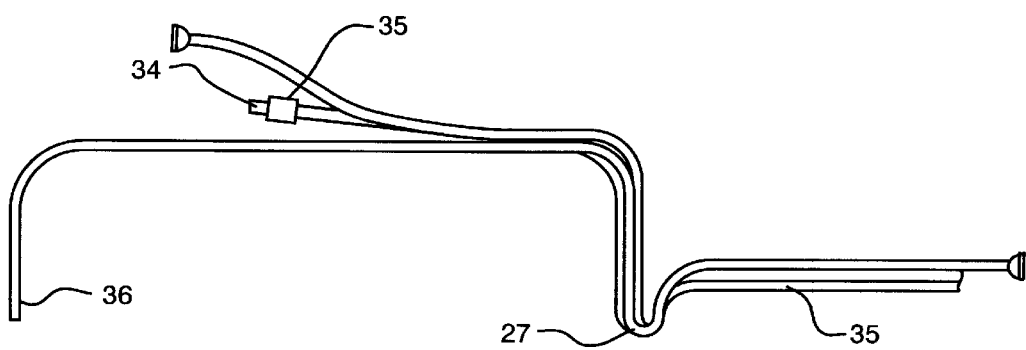
FIG. 2 is a view in elevation of an individual steam manifold heating supply forming part of the first embodiment.

In accordance with the first embodiment of the invention, the device, generally indicated by reference character 10 (FIGS. 1,2 and 3) is used in conjunction with an on-line conveyor 11 (FIG. 1), which passes through first and second openings 12 and 13 formed by first and second side frames 14 and 15.

The side frames 14–15 are similar, each including a lower member 20, first vertical members 21, second vertical members 22, upper members 23, and angularly-disposed members 24.

Figure 6:
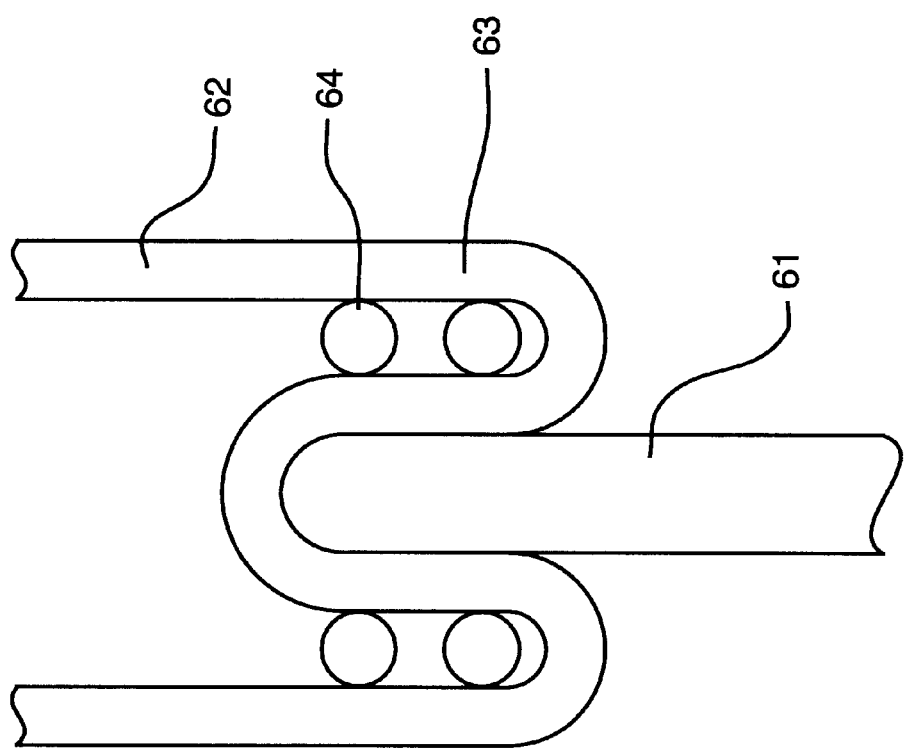
FIG. 6 is a schematic view showing the use of the manifold shown in FIG. 5 in the second embodiment.

Supported by the frames 14–15 are a plurality of first steam manifolds 27 and second steam manifolds 30 (FIGS. 3 and 6) which are positioned to overly the opposed surfaces of the treated workpiece, typically a vehicle seat 31, as it passes through the frames. Each manifold includes a vented rectilinear tube 33 having a steam heater connection 34 controlled by a solenoid valve 35 (FIG. 2), and includes a return conduit 36 for unused steam which is returned to the steam heater for reheating and recirculation.

An electronic control (not shown), typically, a General Electric Fanuc Nlc, provides the functions of controlling the temperature of a head of steam within the steam heater, as well as the temperature of steam within the individual manifolds, and controls venting of the steam heater to prevent excessive pressure build-up.

Figure 3:
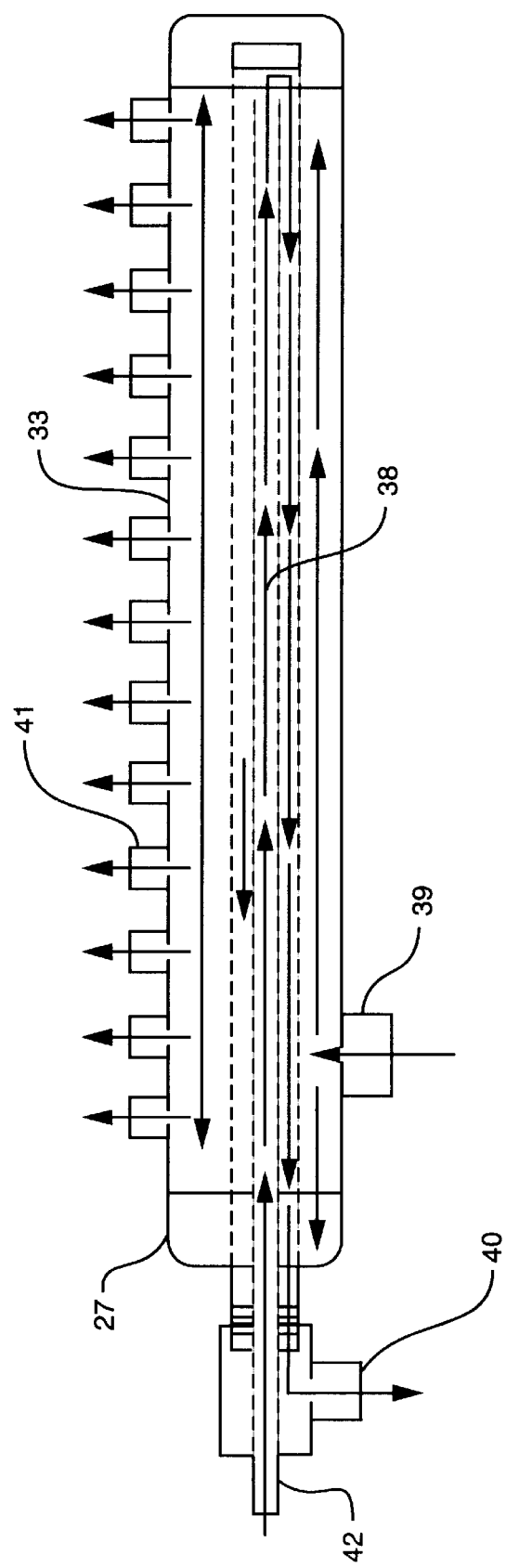
FIG. 3 is a schematic view of a steam cabinet forming part of the first embodiment.

Referring to FIG. 3, there is illustrated a preferred form of manifold, wherein a constant supply of steam maintains the manifold at a constant elevated temperature during those periods of time in which steam is not vented through the nozzles. This is accomplished by an inner tube 38 which receives a separate supply of steam at inlet 39 and separately vented at 40 to be returned to the heater. The individual nozzles 41 are supplied by a separate source 42 when a workpiece is within the cabinet.

Figure 4:
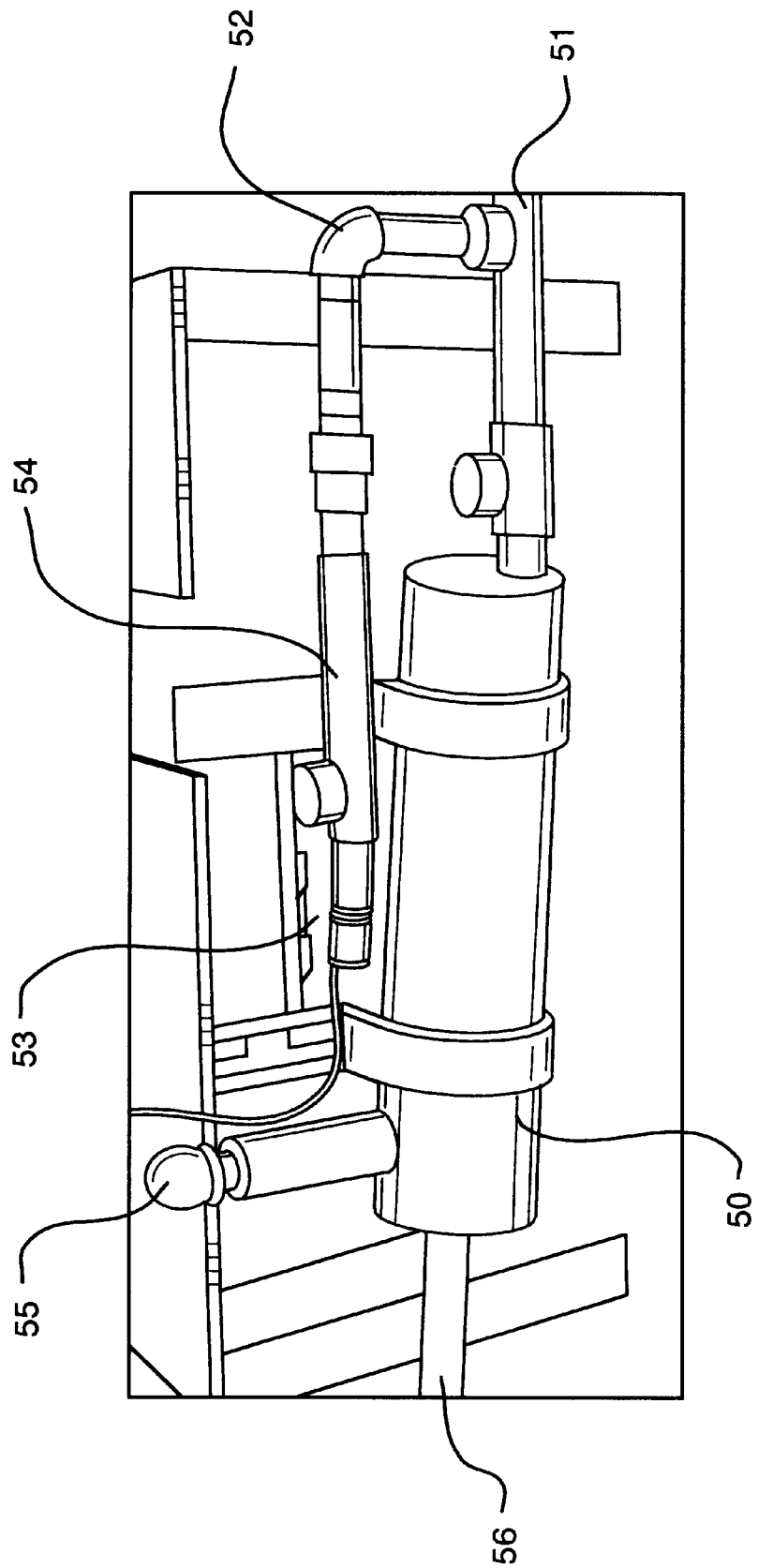
FIG. 4 is a perspective view of a steam super heater.

Referring to FIG. 4, the steam heater includes an electrically powered generator 50 connected to a water supply 51 and a steam return 52 controlled by inlet valve 53. A thermostatic sensor 54 controls the heat of the super heated steam developed. Steam travels through an outlet line 55. A venting line 56 directs excess steam to a drain pipe.

OPERATION

Operation is commenced by creating a head of steam in the steam heater, the presence of which is sensed by the sensor 54. When this information has been transmitted to the control 40, a signal is transmitted to the solenoid valve 35 of each manifold 27–30 to transmit steam through the manifold to be projected on both opposed surfaces of the workpiece 31 being treated. Steam exiting from the manifold which does not pass through the vents will normally condense or remain as a vapor to be drained back to the steam heater.

In order to prevent excessive pressure within the manifold, excess steam is vented to be returned for reheating and subsequent recirculation, thereby achieving minimum heat loss and controlling the use of electric power. The head of steam is maintained at a substantially constant temperature using the thermostatic sensor 54. Upon completion of each operation, the steam flow to the manifolds is interrupted by a workpiece sensor (not shown). A safety valve of known type is associated with the heater should excessive pressure occur.

Figure 5:
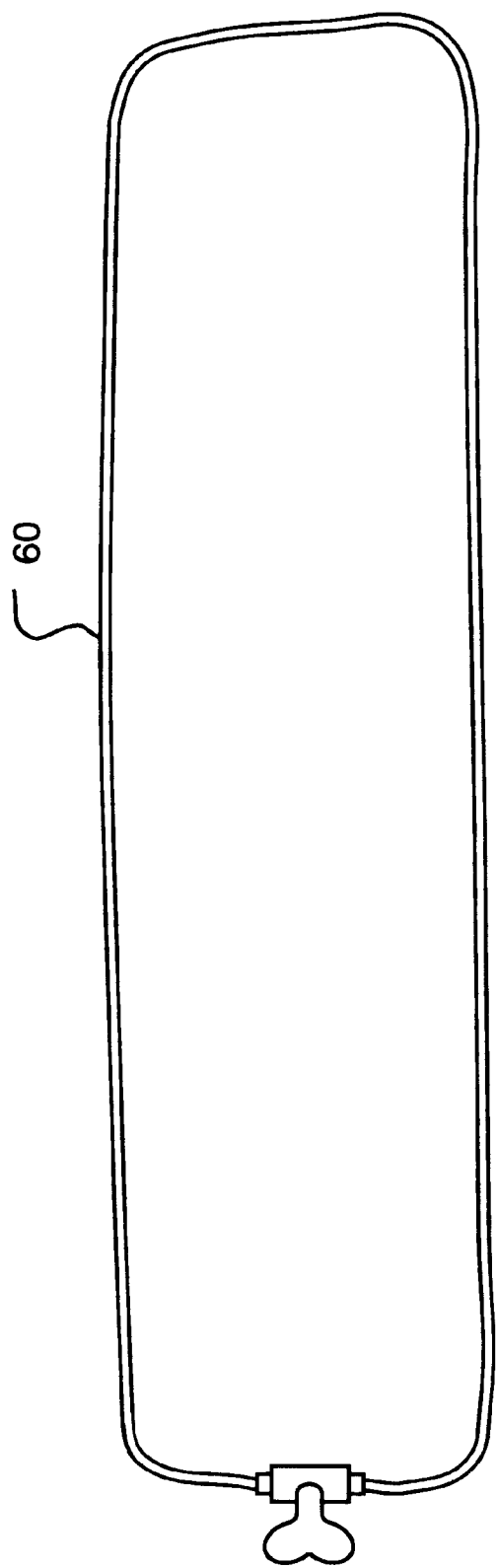
FIG. 5 is a perspective view of a manifold forming part of a second embodiment.

Referring to the second embodiment of the invention (FIGS. 5 and 6), there is illustrated the use of the manifolds 60 which is in the form of a continuous loop with plural spaced openings (not shown) which direct steam to the area enclosed by the loop.

It is known in the art to assemble an automotive seat back 61 which includes a steel frame and associated springs 62 with an upholstered sleeve 63 which includes the outer shell of textile or laminated textile and padded material, by turning the sleeve insideout and progressively unfolding it upon the frame commencing at the upper end thereof. This is conveniently accomplished by a plurality of rollers 64 which rotate about stationery axes with the frame being manually moved through the elongated opening formed by the rollers.

In this method, a degree of wrinkling of the outer surface of the seat back is experienced, which in the past was eliminated using hand-held steaming devices.

In accordance with the second embodiment, this problem is accommodated by positioning the loop-type manifold 60 at a level adjacent the rollers so that the enclosed areas between the inside-out and inverted portions of the sleeve is continuously steamed as the unfolding proceeds. Thus, when the sleeve is completely positioned to complete the seat back, no further steaming is required. The supply of steam to the manifold is controlled as in the first embodiment.

We wish it to be understood that we do not consider the invention to be limited to the precise details of structure shown and set forth in the specification, for obvious modifications will occur to those skilled in the art to which the invention pertains.

We claim:

1. Means for simultaneously heat treating opposed surfaces of an upholstered workpiece on a moving conveyor comprising: an enclosed cabinet having inlet and outlet openings through which the workpiece passes, at least one steam manifold extending parallel to the direction of movement of said workpiece on said conveyor a steam generator developing a source of superheated steam feeding said manifold, means recirculating excess steam from said manifold to said steam generator for reheating, and control means for determining the temperature of steam in said steam generator.

2. Means in accordance with claim 1, further comprising a plurality of manifolds positioned within said cabinet parallel to the path of movement of said workpiece; whereby opposed sides of said workpiece are exposed for simultaneous heat transfers from said manifolds.

3. Means in accordance with claim 1, said at least one manifold including a series of spaced nozzles extending along the axial length thereof.

4. The improvement in accordance with claim 3, wherein each manifold is supplied with steam through a solenoid controlled valve.

5. The method of eliminating wrinkles in the surface of an upholstered workpiece as a continuous operation, comprising the steps of:

a) providing an in-line conveyor means serially transporting plural workpieces;

b) providing an at least partially enclosed cabinet having first and second openings for reception and discharge of individual workpieces, said cabinet including at least one manifold for discharging steam upon a surface of a workpiece as it passes through said cabinets;

c) providing a plurality of upholstered workpieces, and;

d) serially transporting said workpieces through said cabinet, while simultaneously venting said manifold to apply steam to at least one surface of said workpiece.

6. The method in accordance with claim 5, including the further step of. providing plural manifolds for discharging steam simultaneously upon opposed upholstered surfaces of serially fed workpieces.

7. The method in accordance with 6, including the further step of detecting the presence of a workpiece within said cabinet to control the flow of steam through said plural manifolds.

8. In the method of applying an upholstered outer textile shell to a rigid generally planar frame, in which the shell is initially positioned in inside-out condition adjacent a free edge of said frame and progressively folding said shell upon said frame in outside-out condition, the steps of:

a) providing a substantially continuous loop-shaped manifold having vented openings on an inner periphery thereof, said manifold conforming generally to the cross-sectional configuration of said frame, and forming an enclosed area;

b) passing said frame and positioned shell progressively through said area through substantially the entire length thereof, whereby substantially the entire length thereof, whereby substantially the entire exposed surface of said shell is exposed to steaming to eliminate any wrinkles formed as a result of installing said shell on said frame.

9. In the method of assembly of a vehicle seat back in which a generally planar frame is progressively covered by an upholstered sheath, said upholstered sheath being first turned inside-out and unfolded upon said frame to complete assembly of said seat back, the steps of, a) providing a steam manifold in the form of an elongated loop having spaced venting openings therealong to form an enclosed generally planar area;

b) passing said seat back through said enclosed area as said shell is unfolded upon said frame whereby formed wrinkles are substantially eliminated.

* * * * *